(12) United States Patent
Hwang et al.

(10) Patent No.: US 11,189,871 B2
(45) Date of Patent: Nov. 30, 2021

(54) LITHIUM SECONDARY BATTERY AND METHOD OF FABRICATING THE SAME

(71) Applicant: LG Chem, Ltd., Seoul (KR)

(72) Inventors: Won Pill Hwang, Daejeon (KR); Yong Su Choi, Daejeon (KR); Sang Hun Kim, Daejeon (KR); Sang Suk Jung, Daejeon (KR); Cho Long Kim, Daejeon (KR); Yong Kim, Daejeon (KR)

(73) Assignee: LG Chem, Ltd.

( * ) Notice: Subject to any disclaimer, the term of this patent is extended or adjusted under 35 U.S.C. 154(b) by 177 days.

(21) Appl. No.: 15/471,037

(22) Filed: Mar. 28, 2017

(65) Prior Publication Data

US 2017/0288181 A1    Oct. 5, 2017

(30) Foreign Application Priority Data

Mar. 30, 2016  (KR) .................. 10-2016-0038054

(51) Int. Cl.
| | |
|---|---|
| *H01M 50/124* | (2021.01) |
| *H01M 50/116* | (2021.01) |
| *H01M 50/557* | (2021.01) |
| *H01M 10/0525* | (2010.01) |
| *H01M 4/525* | (2010.01) |

(Continued)

(52) U.S. Cl.
CPC ......... *H01M 50/124* (2021.01); *H01M 4/525* (2013.01); *H01M 4/587* (2013.01); *H01M 10/0565* (2013.01); *H01M 50/116* (2021.01); *H01M 50/1245* (2021.01); *H01M 50/557* (2021.01); *H01M 10/0525* (2013.01); *H01M 2300/0082* (2013.01)

(58) Field of Classification Search
CPC . H01M 2/02–0295; H01M 50/10–145; H01M 50/183–186; H01M 4/48–587
See application file for complete search history.

(56) References Cited

U.S. PATENT DOCUMENTS 5,270,133 A * 12/1993 Baumann, III ....... H01M 10/12
264/279
6,245,456 B1 * 6/2001 Fukuda ................. H01M 2/021
429/122

(Continued)

FOREIGN PATENT DOCUMENTS

JP          H06124692 A    5/1994
KR    20120048407 A    5/2012

(Continued)

OTHER PUBLICATIONS

Chinese Search Report for Application No. 201710201367.3, dated Jul. 18, 2019, pp. 1-3.

*Primary Examiner* — Jonathan Crepeau
*Assistant Examiner* — Jacob Buchanan
(74) *Attorney, Agent, or Firm* — Lerner, David, Littenberg, Krumholz & Mentlik, LLP

(57) ABSTRACT

Provided are a lithium secondary battery, which includes an electrode assembly, a battery case accommodating the electrode assembly, a surface layer comprising an engineering plastic located on the outer side of the battery case, and lead terminals connected with the electrode assembly and drawn out of the battery case, and a method of fabricating the same.

6 Claims, 3 Drawing Sheets

(51) Int. Cl.
*H01M 4/587* (2010.01)
*H01M 10/0565* (2010.01)

(56) References Cited

U.S. PATENT DOCUMENTS

| | | | | |
|---|---|---|---|---|
| 2004/0018425 A1* | 1/2004 | Kejha | ................... | H01G 9/10 429/176 |
| 2006/0093906 A1* | 5/2006 | Yamashita | .............. | B32B 15/08 429/176 |
| 2007/0264535 A1* | 11/2007 | Lee | ................... | H01M 2/0207 429/7 |
| 2010/0255365 A1* | 10/2010 | Suzuta | ................... | B32B 7/12 429/163 |
| 2010/0291431 A1* | 11/2010 | Shih | ................... | H01M 2/0207 429/159 |
| 2011/0033745 A1* | 2/2011 | Ishida | ................... | H01G 9/155 429/178 |
| 2013/0323566 A1 | 12/2013 | Morikawa et al. | | |
| 2015/0004467 A1* | 1/2015 | Kim | ................... | H01M 2/1646 429/145 |
| 2015/0372263 A1* | 12/2015 | Douke | ................. | B32B 27/306 429/176 |

FOREIGN PATENT DOCUMENTS

| KR | 101305242 B1 | 9/2013 |
|---|---|---|
| KR | 20140048602 A | 4/2014 |

\* cited by examiner

LITHIUM SECONDARY BATTERY AND METHOD OF FABRICATING THE SAME

CROSS-REFERENCE TO RELATED APPLICATION

This application claims priority to and the benefit of Korean Patent Application No. 10-2016-0038054, filed on Mar. 30, 2016, the disclosure of which is incorporated herein by reference in its entirety.

BACKGROUND

1. Field of the Invention

The present invention relates to a lithium secondary battery and a method of fabricating the same.

2. Discussion of Related Art

Recently, rechargeable secondary batteries have been widely used as energy sources for wireless mobile devices. Secondary batteries have also attracted attention as power sources for electric vehicles (EVs), hybrid electric vehicles (HEVs), etc., which are suggested as a solution for solving air pollution caused by conventionally-used gasoline or diesel vehicles which use fossil fuels.

Typically, in terms of the shape of a battery, there is a high demand for thin prismatic and pouch-type secondary batteries, which can be applied to products such as mobile phones, etc. In terms of the material for an electrode, there is a high demand for lithium secondary batteries such as lithium ion batteries, lithium-ion polymer batteries, etc., which have advantages such as high energy density, discharging voltage, output stability, etc.

Recently, a pouch-type battery having a structure in which such electrode assemblies are enclosed in a pouch-type battery case of a laminate sheet comprising aluminum is drawing great attention because of a low production cost, a small weight, or easy deformation, and its use is gradually increasing.

However, such a pouch-type battery has a problem of a short circuit caused by aluminum included in the pouch-type battery case. In addition, an electrolyte in the pouch-type battery case is often leaked even when the case is heat-sealed at an interface between lead terminals and the pouch-type battery case.

SUMMARY OF THE INVENTION

The present invention is directed to providing a lithium secondary battery having excellent sealability.

The present invention is also directed to providing a lithium secondary battery having excellent insulability.

The present invention is also directed to providing a lithium secondary battery, which has a reduced production cost and a simple fabrication method.

To solve the above-mentioned problems, the present invention provides a lithium secondary battery, which comprises an electrode assembly; a battery case configured to accommodate the electrode assembly; a surface layer comprising an engineering plastic located on the outer side of the battery case; and lead terminals connected with the electrode assembly and drawn out of the battery case.

In addition, the present invention provides a method of fabricating a lithium secondary battery, which comprises forming a surface layer comprising an engineering plastic on the outer side of a battery case accommodating an electrode assembly so as to draw lead terminals connected with the electrode assembly out of the battery case.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, the present invention will be described in further detail to help in understanding of the present invention.

The terms and words used herein and in the claims should not be interpreted as being limited to conventional or literal meanings, but should be interpreted with meanings and concepts which are consistent with the technological scope of the invention based on the principle that the inventors have appropriately defined concepts of terms in order to describe the invention in the best way.

Figure 1:
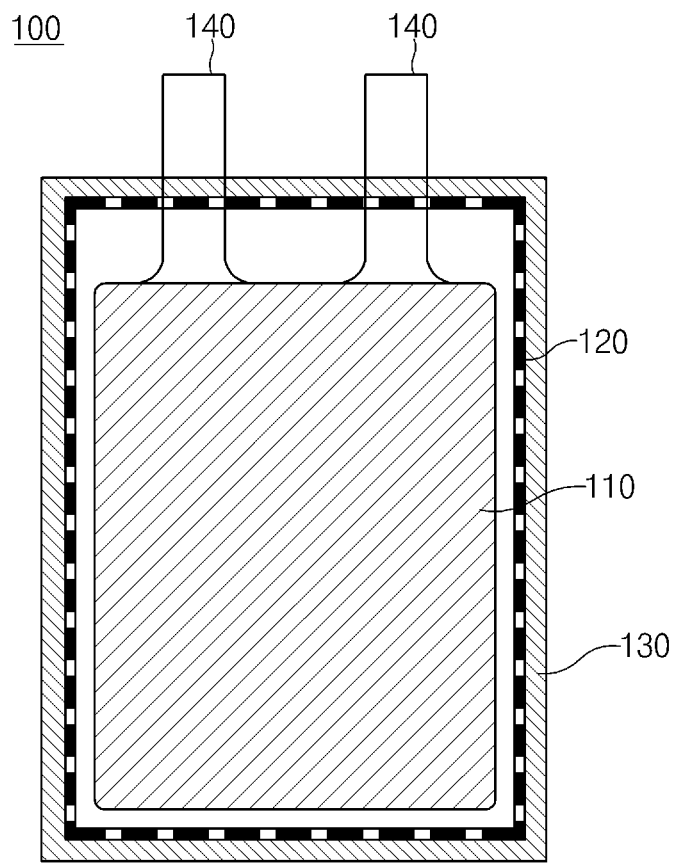
FIG. 1 is a plan view of a lithium secondary battery according to one embodiment of the present invention.
Figure 2:
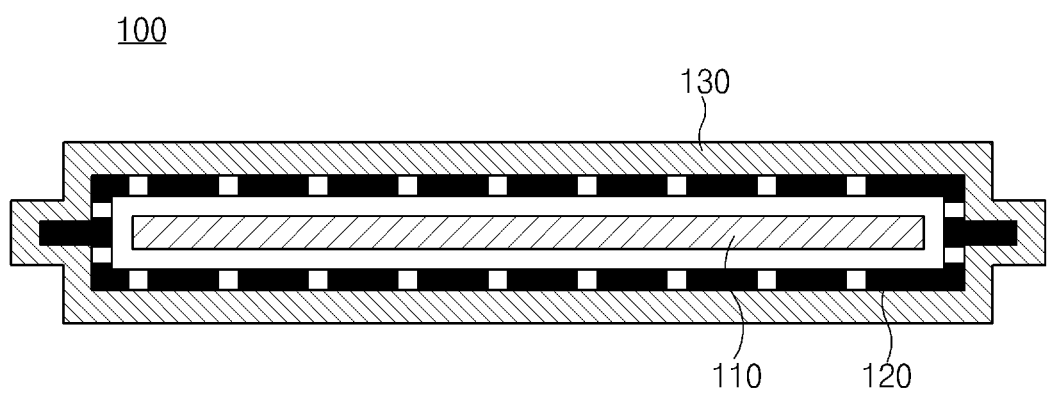
FIG. 2 is a cross-sectional view of the lithium secondary battery according to one embodiment of the present invention.

FIG. 1 is a plan view of a lithium secondary battery according to one embodiment of the present invention, and FIG. 2 is a cross-sectional view of the lithium secondary battery according to one embodiment of the present invention.

Referring to FIGS. 1 and 2, an electrode assembly 110 comprised in a lithium secondary battery 100 according to one embodiment of the present invention comprises a positive electrode (not shown), a negative electrode (not shown), and a separator (not shown) located between the positive electrode and the negative electrode.

The positive electrode comprises a positive electrode current collector, and a mixture of a positive electrode active material, a conductive material and a binder on the positive electrode current collector. The mixture may further include a filler.

The positive electrode current collector has high conductivity without causing a chemical change in the lithium secondary battery of the present invention. The positive electrode current collector may have an uneven surface so as to increase an adhesive strength of the positive electrode active material and may have various forms including a film, a sheet, a foil, a net, a porous body, a foam body, a non-woven fabric body, etc. A specific example of the positive electrode current collector may be stainless steel, aluminum, nickel, titanium, sintered carbon, or aluminum. In addition, the surface of the stainless steel may be treated with carbon, nickel, titanium, or silver.

A specific example of the positive electrode active material may be a layered compound such as a lithium transition metal oxide, lithium cobalt oxide ($LiCoO_2$), or lithium nickel oxide ($LiNiO_2$); a compound substituted with at least one or two transition metals; a lithium manganese oxide represented by the formula $Li_{1+x}Mn_{2-x}O_4$ (x=0 to 0.33), $LiMnO_3$, $LiMn_2O_3$, or $LiMnO_2$; lithium copper oxide ($Li_2CuO_2$); a vanadium oxide such as $LiV_3O_8$, $LiFe_3O_4$, $V_2O_5$, or $Cu_2V_2O_7$; a lithium manganese composite oxide represented by the formula $LiNi_{1-x}M_xO_2$ (M=Co, Mn, Al, Cu, Fe, Mg, B or Ga, and x=0.01 to 0.3); a lithium manganese oxide having a spinel structure, represented by $LiNi_xMn_{2-x}O_4$; $LiMn_2O_4$ in which some of Li in the formula are substituted with alkaline earth metal ions; a disulfide compound; $Fe_2(MoO_4)_3$; or a nickel cobalt manganese oxide.

The conductive material has conductivity without causing a chemical change in the lithium secondary battery of the present invention. A specific example of the conductive material may be graphite such as natural graphite or artificial graphite; carbon black such as acetylene black, Ketjen black, channel black, furnace black, lamp black or thermal black; a conductive fiber such as carbon fiber or metal fiber; metal powder such as fluorocarbon, aluminum or nickel powder; conductive whisky such as zinc oxide or potassium titanate; a conductive metal oxide such as titanium oxide; or a conductive substance such as a polyphenylene derivative.

The binder is a component for assisting the binding of a positive electrode active material with a conductive material and the like, and the binding to a current collector. Specific examples of the binders may include polyvinylidene fluoride, polyvinyl alcohol, carboxymethylcelluose (CMC), starch, hydroxypropylcellulose, regenerated cellulose, polyvinylpyrrolidone, tetrafluoroethylene, polyethylene, polypropylene, ethylene-propylene-diene monomer (EPDM) rubber, hydrogenated nitrile butadiene rubber (HNBR), sulfonated EPDM, styrene butadiene rubber, fluorinated rubber, various copolymers, etc.

The filler is a component for inhibiting the expansion of a positive electrode, and a fibrous material not causing a chemical change in the lithium secondary battery of the present invention. Examples of the fillers may include an olefin-based polymer such as polyethylene, polypropylene, etc.; a fibrous material such as a glass fiber, a carbon fiber, etc., and the like.

The negative electrode comprises a negative electrode current collector and a negative electrode active material located on the negative electrode current collector. The negative electrode may further comprise a conductive material, a binder, a filler, etc.

The negative electrode current collector has conductivity without causing a chemical change in the battery. A specific example of the negative electrode current collector may be copper, stainless steel, aluminum, an aluminum-cadmium alloy, nickel, titanium, or sintered carbon. The surface of the copper or stainless steel may be treated with carbon, nickel, titanium, or silver. The negative electrode current collector, like the positive electrode current collector, may have a slightly uneven surface to reinforce a binding strength of the negative electrode active material, and may be used in various forms including a film, a sheet, a foil, a net, a porous body, a foam body, a non-woven fabric body, and the like.

A specific example of the negative electrode active material may be carbon such as hard carbon or graphite-based carbon; a metal composite oxide such as $Li_xFe_2O_3$ ($0 \leq x \leq 1$), $Li_xWO_2$ ($0 \leq x \leq 1$), or $Sn_xMe_{1-x}Me'_yO_z$ (Me=Mn, Fe, Pb, Ge; Me'=Al, B, P, Si, an element of Group 1, 2 or 3 of the periodic table, or a halogen; $0 < x \leq 1$; $1 \leq y \leq 3$; $1 \leq z \leq 8$); a lithium metal; a lithium alloy; a silicon-based alloy; a tin-based alloy; a metal oxide such as SnO, $SnO_2$, PbO, $PbO_2$, $Pb_2O_3$, $Pb_3O_4$, GeO, $GeO_2$, $Bi_2O_3$, or $Bi_2O_5$; a conductive polymer such as polyacetylene; a Li—Co—Ni-based material; titanium oxide; or lithium titanium oxide.

Descriptions of the conductive material, binder and filler are the same as those of the conductive material, binder and filler, which are used for a positive electrode, and will thus be omitted.

The separator prevents a short circuit between the negative electrode and the positive electrode and provides a migration path for lithium ions. The separator may include an insulating thin film which has high ion permeability and mechanical strength. A specific example of the separator may be a polyolefin-based polymer film including polypropylene or polyethylene or a multilayer film including polypropylene and polyethylene, a microporous film, or a woven or non-woven fabric. When a solid electrolyte such as a polymer is used as an electrolyte, the solid electrolyte may also serve as a separator.

Subsequently, a battery case 120 included in one embodiment of the present invention is configured to accommodate the electrode assembly 110. The battery case 120 may be a pouch-type battery case. The battery case 120 may have either a single layer structure or a multilayer structure.

When the battery case 120 has a single layer structure, it has to be formed of an insulating material through which electricity does not flow. Since the battery case 120 is in direct contact with lead terminals 140, which will be described below, when sealed, only the insulating material prevents a short circuit between the battery case 120 and the lead terminals 140 without a separate insulating member and, even when the electrode assembly 110 and the battery case 120 are in direct contact with each other due to an external impact, a short circuit does not occur. A specific example of the insulating material may be polyethylene or polypropylene. When the battery case 120 has a single layer structure, compared to a multilayer structure, the single layer structure has a lower production cost, does not need a lamination process, and thus has a simple fabrication method.

On the other hand, when the battery case 120 has a multilayer structure, the multilayer structure may comprise an aluminum layer, an outer layer located on one surface of the aluminum layer, and an inner layer located on the other surface of the aluminum layer. Materials for the outer and inner layers may be the same or different from each other, and may be insulating materials through which electricity does not flow. Specific examples of the materials constituting the outer and inner layers may include polypropylene (PP), biaxially oriented nylon (ONY), polyethylene terephthalate (PET), polybutylene terephthalate, a copolymer ester, or polycarbonate. In addition, a separate adhesive layer may be further included between the aluminum layer and the outer layer, and between the aluminum layer and the inner layer.

Subsequently, a surface layer 130 comprised in the lithium secondary battery 100 according to one embodiment of the present invention is located on an entire surface of the outer side of the battery case 120. As the surface layer 130 comprises an engineering plastic, the surface layer 130 serves to prevent an electrolyte solution from being leaked from the battery case 120 to the outside, and to prevent external moisture from permeating into the battery case 120, that is, to seal the battery case 120. In addition, since the surface layer 130 serves to seal the battery case, instead of an aluminum layer, which is generally used for sealing a battery case, the battery case of the lithium secondary battery comprising the surface layer does not need to include an aluminum layer. Therefore, the problem of a short circuit in the battery case caused by an aluminum layer may be solved, and the lithium secondary battery has excellent insulability.

When the battery case 120 does not comprise an aluminum layer, and has a single layer structure formed of an insulating material, the surface layer 130 may be located to cover the entire surface of the outer side of the battery case 120 to seal the battery. Even when the battery case 120 has a multilayer structure including an aluminum layer, the surface layer 130 may be located to cover the entire surface of the outer side of the battery case 120 to enhance sealability. Further, the surface layer 130 may be located to have a structure that encloses the battery case 120, except for lead terminals 140 that will be described below, regardless of the structure of the battery case 120.

The surface layer 130 may have a thickness of 1 to 10 μm, preferably 2 to 7 μm, and more preferably 3 to 5 μm. When the above-described thickness is satisfied, the leakage of the electrolyte solution and the permeation of external moisture may be prevented.

The engineering plastic may be at least one or two selected from the group consisting of polyamide (PA), polyacetal (POM), polycarbonate (PC), modified polyphenylene ether (PPE), polybutylene terephthalate (PBT), GF-reinforced-polyethylene terephthalate (GF-PET), ultra-high-molecular-weight polyethylene (UHPE), polysulfone (PSF), polyethersulfone (PES), polyphenylenesulfide (PPS), polyarylate (PAR), polyamideimide (PAI), polyetherimide (PEI), polyetheretherketone (PEEK), polyimide (PI), liquid crystal polyester (LCP), polytetrafluoroethylene (PTFE), polyaminobismaleimide (PABM), and polybisamidetriazole (PBT). Specifically, the engineering plastic may be polyamideimide.

Subsequently, the lithium secondary battery 100 of the present invention may include an electrolyte (not shown). The electrolyte may be a non-aqueous electrolyte containing a lithium salt. The lithium salt may be, for example, LiCl, LiBr, LiI, LiClO$_4$, LiBF$_4$, LiB$_{10}$Ch$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, (CF$_3$SO$_2$)$_2$NLi, a lower aliphatic lithium carboxylate, tetraphenyl lithium borate, or an imide.

The non-aqueous electrolyte is not particularly limited as long as it is used in the battery, but a specific example thereof may be a non-aqueous liquid electrolyte, an organic solid electrolyte, or an inorganic solid electrolyte. In the present invention, it is preferable to use an organic solid electrolyte which is a polymer electrolyte. A specific example of the organic solid electrolyte may be a polyethylene derivative, a polyethylene oxide derivative, a polypropylene oxide derivative, a phosphate ester polymer, poly agitation lysine, polyester sulfide, polyvinylalcohol, polyvinylidene fluoride or a polymer containing an ionic dissociation group.

Subsequently, the lead terminals 140 comprised in the lithium secondary battery 100 of the present invention are connected with the electrode assembly 110, and drawn out of the pouch-type battery case 120. The surface layer 130 may not be located or located partially on surfaces of the lead terminals 140. One of the lead terminals 140 refers to a negative electrode lead terminal electrically connected with the negative electrode, and the other thereof refers to a positive electrode lead terminal electrically connected with the positive electrode. The lead terminals 140 and the electrode assembly 110 may be electrically connected by resistance welding, ultrasonic welding, or laser welding. A tab may be further located between the lead terminals 140 and the electrode assembly 110.

Figure 3:
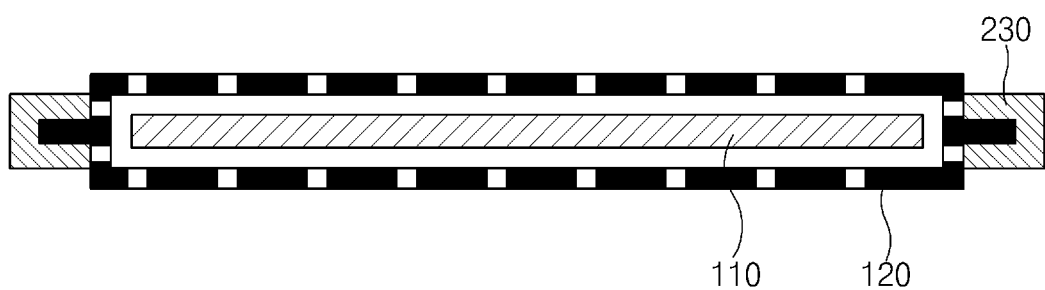
FIG. 3 is a cross-sectional view of a lithium secondary battery according to another exemplary embodiment of the present invention.

FIG. 3 is a diagram illustrating a surface layer 230 according to another embodiment of the present invention. Referring to FIG. 3, the surface layer 230 is located at a partial region of the outer side of the battery case 120, which is a partial region comprising a sealing part. In this case, the battery case 120 may have a multilayer structure including an aluminum layer. This is because, when the battery case 120 has a single layer structure formed of only an insulating material, the sealing performance of the battery case itself is low. Thus, when the battery case 120 having a multilayer structure including an aluminum layer with a certain degree of sealability is used, the surface layer 230 may be located only in a partial region of the battery case 120.

Hereinafter, a method of fabricating a lithium secondary battery according to the present invention will be described.

The method of fabricating a lithium secondary battery according to the present invention comprises forming a surface layer comprising an engineering plastic on the outer side of a battery case 120 accommodating an electrode assembly 110 so as to draw lead terminals 140 out of the electrode assembly 110.

The step of forming the surface layer may comprise a first step of dip-coating the battery case in a solution comprising an engineering plastic; and a second step of drying the dip-coated battery case at 170 to 190° C. for 2 to 4 hours to form the surface layer.

The surface layer may be formed on the entire surface of the outer side of the battery case, and may be formed on a partial region including a sealing part of the battery case. A specific example of the engineering plastic is the same as described above, and a specific example of the solvent may be dimethylsulfoxide, hexamethylenesulfoxide, N,N-dimethylformamide, N,N-dimethylacetamide, N-methyl-2-pyrrolidone, N-methyl-2-pyrrolidone, 1,3-dimethyl-2-imidazolidinone or sulfolane.

The method of fabricating a lithium secondary battery according to the present invention may further comprise sealing the battery case by thermal bonding at 180 to 195° C. under a pressure of 0.30 to 0.5 MPa for 2 to 4 seconds before the first step. When the sealing step is further comprised, an unexpected accident in which an electrolyte is leaked during the above-described dip coating process can be prevented. Moreover, a short circuit caused by thermal bonding can be prevented.

Meanwhile, the lithium secondary battery of the present invention may be used in a battery module comprising a unit battery, a battery pack comprising the battery module, and a device using the battery pack as a power source. A specific example of the device may be, but is not limited to, a power tool actuated by an electric motor; electric vehicles comprising an electric vehicle (EV), a hybrid electric vehicle (HEV), a plug-in hybrid electric vehicle (PHEV), etc.; electric two-wheeled vehicles including an E-bike and an E-scooter; an electric golf cart; a system for storing power or the like.

Hereinafter, exemplary examples will be provided to help in understanding of the present invention. However, it is apparent to those of ordinary skill in the art that the above descriptions of the present invention are exemplary, and the exemplary embodiments disclosed herein can be easily modified into other specific forms without changing the technical spirit or essential features of the present invention, and such variations and modifications should be within the scope of the appended claims.

Example 1

Preparation of a Solution for Coating a Surface Layer 25 g of polyamideimide (PAI) was added to 80 ml of N,N-dimethylacetamide and dissolved by stirring at room temperature for 24 hours, thereby preparing a coating solution comprising 25 wt % of polyamideimide.

Fabrication of a Positive Electrode 200 g of a mixture of 92 wt % of a lithium cobalt composite oxide as a positive electrode active material, 4 wt % of carbon black as a conductive material and 4 wt % of polyvinylidenefluoride (PVDF) as a binder polymer was prepared, and added to 220 ml of N-methyl-2-pyrrolidone (NMP) as a solvent, thereby preparing a positive electrode mixture slurry. A positive electrode was fabricated by applying the positive electrode mixture slurry to a 20-μm-thick aluminum (Al) thin film of a positive electrode current collector and drying the applied positive electrode mixture slurry, and then roll pressing was performed thereon.

Fabrication of a Negative Electrode 200 g of a mixture of 96 wt % of carbon powder as a negative electrode active material, 1 wt % of carbon black as a conductive material, and 3 wt % of PVDF as a binder polymer was prepared, and then added to 220 ml of NMP as a solvent, thereby preparing a negative electrode mixture slurry. A negative electrode was fabricated by applying the negative electrode mixture slurry to a 10-μm-thick copper (Cu) thin film, which is a negative electrode current collector, and drying the applied negative electrode mixture slurry, and then roll pressing was performed thereon.

Fabrication of a Battery

An electrode assembly was fabricated by stacking the positive electrode and negative electrode, which were fabricated above, and a polyethylene separator. The electrode assembly and lead terminals (aluminum (Al050)-nickel-copper (Cl100 plated on the surface thereof with nickel at a thickness of 1 μm)) were connected by ultrasonic welding. The electrode assembly was accommodated in a pouch-type battery case having a polypropylene single layer structure and disposed such that the lead terminal was drawn out of the battery case, and then the battery case was assembled. Subsequently, an electrolyte solution (ethylenecarbonate (EC)/ethylmethylcarbonate (EMC)=½ (volume ratio), 1 mole of lithium hexafluorophosphate (LiPF$_6$)) was injected into the battery case. Following the fixation of the battery case using a jig, the battery case was dip-coated with the coating solution to a thickness of 3 μm and dried at 177° C. for 3 hours, thereby completing a battery.

Example 2

An electrode assembly was fabricated as described in Example 1, and then lead terminals, which were the same as used in Example 1, were connected to the electrode assembly. The electrode assembly was accommodated in a pouch-type battery case having a PP/Al/ONY/PET structure and disposed such that the lead terminals were drawn out of the battery case, and then the battery case was assembled. Subsequently, 30 g of an electrolyte solution (EC/EMC=½ (volume ratio), 1 mole of LiPF$_6$) was injected into the battery case. Following the fixation of the battery case using a jig, the battery case was dip-coated with the coating solution to a thickness of 3 μm and dried at 177° C. for 3 hours, thereby completing a battery.

Example 3

A battery was fabricated in the same manner as described in Example 1, except that a battery case into which an electrolyte solution had been injected was fixed using a jig, subjected to thermal bonding at 190° C. under a pressure of 0.4 MPa for 3 seconds, and dip-coated with the coating solution.

Comparative Example 1

An electrode assembly was fabricated as described in Example 1. The electrode assembly and lead terminals (aluminum (Al050)-nickel-copper (Cl100 plated on the surface thereof with nickel at a thickness of 1 μm)) were connected by welding. An insulating member, polypropylene, was formed on the lead terminals. The electrode assembly was accommodated in a pouch-type battery case having a PP/Al/ONY/PET structure, and disposed such that the lead terminals were drawn out of the battery case and the insulating member was positioned in contact with the battery case, and then the battery case was assembled. Subsequently, 30 g of an electrolyte solution (EC/EMC=½ (volume ratio), 1 mole of LiPF$_6$) was injected into the battery case. Afterward, the battery case was sealed by thermal bonding at 190° C. under a pressure of 0.4 MPa for 3 seconds, thereby completing a battery.

Comparative Example 2

A battery was fabricated in the same manner as described in Comparative Example 1, except that thermal bonding of a battery case was performed at 210° C. under a pressure of 0.5 MPa for 3 seconds.

Experimental Example

Evaluation of Sealability

Batteries of Example 1, Example 2, Example 3 and Comparative Example 1 were stored at 60° C. and a humidity of 90% for 32 weeks, and then the sealability of each lithium secondary battery was evaluated.

First, each of the batteries of Example 1, Example 2, Example 3 and Comparative Example 1 was visually examined to check whether the electrolyte had leaked out of the battery. There was no sign of the leakage of the electrolyte out of the battery from any of the batteries of Example 1, Example 2, Example 3 and Comparative Example 1.

The hydrogen fluoride (HF) concentration of the electrolyte solution in each of the batteries of Example 1, Example 2, Example 3, and Comparative Example 1 was measured. In the batteries of Example 1, Example 2, and Example 3, no HF was detected in the electrolyte solution, but in the battery of Comparative Example 1, the HF concentration in the electrolyte was detected at 6.7%. Thus, it can be shown that external moisture had permeated into the battery.

When an electrolyte solution contains LiPF$_6$ lithium salt, LiPF$_6$ must be present in the form of Li$^+$ and PF$_6^-$ ions. However, when a side reaction occurs unintentionally, unstable PF$_5$ is obtained as a byproduct, which reacts with H$_2$O to produce HF. Accordingly, it is necessary to check the HF concentration in an electrolyte solution to evaluate whether external moisture has permeated into a battery.

Evaluation of Insulability

The batteries of Example 1, Example 2, and Example 3 were left under the sealing conditions for the battery of Comparative Example 2, that is, at 210° C. under a pressure of 0.5 MPa for 3 seconds, and then subjected to evaluation of whether dielectric breakdown had occurred in each battery.

While the lithium secondary batteries of Examples according to the present invention did not have dielectric breakdown, the lithium secondary battery of Comparative Example 2 had a short circuit because the polypropylene of the insulating member and the polypropylene of the inner layer of the battery case melted during the thermal bonding, and thus the lead terminals were in contact with the aluminum layer of the battery case. More specifically, a resistance between the exposed aluminum and the individual lead terminal was 100 mΩ, and, due to dielectric breakdown, electrochemical oxidation of the electrolyte occurred and thus the battery was swollen.

A lithium secondary battery of the present invention has excellent sealability due to a surface layer located on the outer side of a battery case, and thus an electrolyte solution is not leaked out of the battery and external moisture does not penetrate into the battery.

As the lithium secondary battery of the present invention has excellent sealability due to the surface layer, a multilayer battery case comprising an aluminum layer is not necessarily used. Therefore, since the lithium secondary battery of the present invention can use a battery case composed of an insulating material, although the battery case is in direct contact with lead terminals, there is no risk of a short circuit, and thus the lithium secondary battery has an excellent insulability.

Since the lithium secondary battery of the present invention uses a dip coating method, instead of thermal bonding, to seal the battery case, the lithium secondary battery does not need expensive equipment, and thus the production cost is reduced.

In the lithium secondary battery of the present invention, the battery case can have a single layer structure formed of an insulating material through which electricity does not flow, the battery case does not need a lamination process, compared with the battery case having a multilayer structure, which includes a conventional aluminum layer. Thus, the method of fabricating the lithium secondary battery of the present invention is simpler than a conventional method of fabricating a lithium battery.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A lithium secondary battery comprising:
   an electrode assembly;
   a battery case configured to accommodate the electrode assembly;
   a surface layer comprising an engineering plastic located on the outer side of the battery case; and
   lead terminals connected with the electrode assembly and drawn out of the battery case,
   wherein the battery case comprises a sealing part, and
   wherein the surface layer is located on an entire surface of the outer side of the battery case including the sealing part,
   wherein the surface layer has a thickness of 1 µm to 10 µm,
   wherein the engineering plastic includes at least one or two selected from the group consisting of polyamide (PA), polyacetal (POM), polycarbonate (PC), modified polyphenylene ether (PPE), polybutylene terephthalate (PBT), GF-reinforced-polyethylene terephthalate (GF-PET), ultra-high-molecular-weight polyethylene (UHPE), polysulfone (PSF), polyethersulfone (PES), polyphenylenesulfide (PPS), polyarylate (PAR), polyamideimide (PAI), polyetherimide (PEI), polyetheretherketone (PEEK), polyimide (PI), liquid crystal polyester (LCP), polytetrafluoroethylene (PTFE), polyaminobismaleimide (PABM), and polybisamidetriazole (PBT), and
   wherein the battery case is a pouch-type battery case having a multiple layer structure comprising an aluminum layer, an outer layer located on one surface of the aluminum layer and an inner layer located on the other surface of the aluminum layer,
   wherein the battery case is not thermal bonded and the surface layer is formed by dip coating.

2. The lithium secondary battery according to claim 1, wherein the materials for the outer layer and the inner layer are insulating materials.

3. The lithium secondary battery according to claim 2, wherein the insulating materials are polypropylene (PP), biaxially oriented nylon (ONY), polyethylene terephthalate (PET), polybutylene terephthalate, a copolymer ester or polycarbonate.

4. The lithium secondary battery according to claim 1, wherein the lithium secondary battery includes a polymer electrolyte.

5. A method of fabricating a lithium secondary battery of claim 1, comprising forming a surface layer comprising an engineering plastic on the outer side of a battery case accommodating an electrode assembly so as to draw lead terminals connected with the electrode assembly out of the battery case,
   wherein the battery case comprises a sealing part, and
   wherein the surface layer is located on an entire surface of the outer side of the battery case including the sealing part.

6. The method according to claim 5, wherein the forming of the surface layer comprises:
   a first step of dip-coating the battery case in a solution comprising an engineering plastic; and
   a second step of drying the dip-coated battery case at 170 to 190° C. for 2 to 4 hours to form the surface layer.

* * * * *